United States Patent [19]

Wakabayashi et al.

[11] 4,144,998
[45] Mar. 20, 1979

[54] DOUBLE THROW THERMAL VALVE

[75] Inventors: Makoto Wakabayashi, Norton; John Doherty, Jr., Assonet, both of Mass.

[73] Assignee: Texas Instruments Incorporated, Dallas, Tex.

[21] Appl. No.: 785,010

[22] Filed: Mar. 30, 1977

Related U.S. Application Data

[63] Continuation of Ser. No. 530,800, Dec. 9, 1974, abandoned.

[51] Int. Cl.² ............................................. G05D 23/10
[52] U.S. Cl. ..................... 236/48 R; 236/87; 236/101 A; 236/101 E
[58] Field of Search ............... 236/87, 101 A, 101 C, 236/101 E, 48 R; 137/625.27, 625.5; 337/343, 362, 365; 73/363.5, 378.3

[56] References Cited

U.S. PATENT DOCUMENTS

| | | | |
|---|---|---|---|
| 2,894,392 | 7/1959 | McLaughlin | 73/363.5 |
| 3,383,041 | 5/1968 | Stratynski | 236/86 |
| 3,542,289 | 11/1970 | Ojala et al. | 236/48 R |
| 3,853,268 | 12/1974 | Schneider | 236/48 R |

*Primary Examiner*—William E. Wayner
*Assistant Examiner*—William E. Tapolcai, Jr.
*Attorney, Agent, or Firm*—John A. Haug; James P. McAndrews

[57] ABSTRACT

An improved thermally actuated valve assembly having a double throw feature comprises three ports in which two passages are provided among these three ports; one passage connecting ports one and two and the other passage connecting ports two and three. At a predetermined temperature a snap-acting bimetallic member causes a change in communication from one of the passages to the other.

8 Claims, 3 Drawing Figures

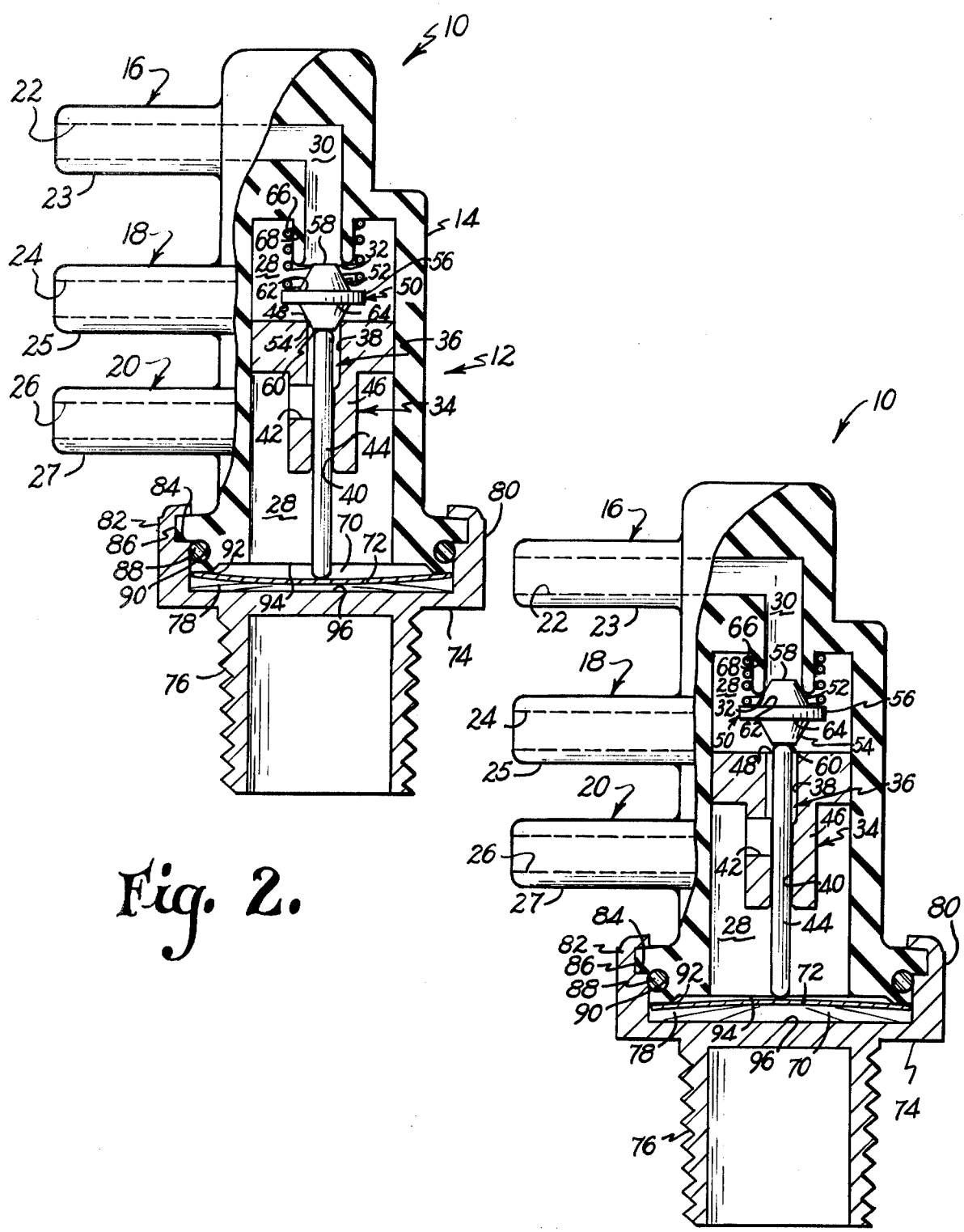

DOUBLE THROW THERMAL VALVE

This is a continuation, of application Ser. No. 530,800, filed Dec. 9, 1974 now abandoned.

BACKGROUND AND SUMMARY OF INVENTION

This invention relates to a thermally actuated valve assembly and more particularly to a double throw thermal vacuum valve useful for instance in automotive emission control systems.

Wax actuated valves have long been used for automotive applications. These valves consist of a spool valve which is actuated by a volume change of wax upon reaching a predetermined temperature. These valves, however, due to the high pressure buildup are subject to loss of wax and consequently a shift of operating temperature and are also costly to manufacture. Another problem occurs in valves using elastomeric seals which exhibit permanent deformation due to excessive compression of the seal.

It is an object of this invention to provide a thermally responsive valve assembly which is simple and economical to manufacture while being reliable and not subject to shifting of operational temperature. It is another object to provide a thermally responsive double throw valve assembly which is compact in size and to which three pieces of tubing or the like may be readily connected to one end of the valve assembly. It is yet another object to provide a valve assembly which minimizes deleterious compression of elastomeric valve means. Other objects and features of this invention will be in part apparent and in part pointed out hereinafter.

Briefly, the double throw thermally responsive valve assembly of this invention comprises a two part valve body, a first part having three ports extending from the valve body and a second part with a central cavity into which the first part is partially housed. In the bottom of this cavity a wave washer spring is placed with a snap-acting bimetallic disc positioned on top of it. Touching the top of the disc is a motion transfer pin which is biased toward the disc by a spring so the pin moves between a first and second position as the disc moves between a first and second position in response to a variation in temperature. The transfer pin extends up into the top part of the valve body into contact with a rubber stopper which acts as a seal for both a top and bottom valve seat. When the bimetallic disc is in a first configuration the stopper rests against the lower valve seat allowing free passage between a first port and a second port and then when the disc snaps to a second configuration the stopper then seals the upper valve seat allowing free passage between the second port and a third port.

BRIEF DESCRIPTION OF THE DRAWINGS

FIG. 2 is a partial sectional view of FIG. 1 with the lower valve seat closed; and FIG. 3 is a view similar to FIG. 2 only with the upper valve seat closed.

Corresponding reference characters indicate corresponding parts throughout the several views of the drawings.

DESCRIPTION OF THE PREFERRED EMBODIMENTS

Figure 1:
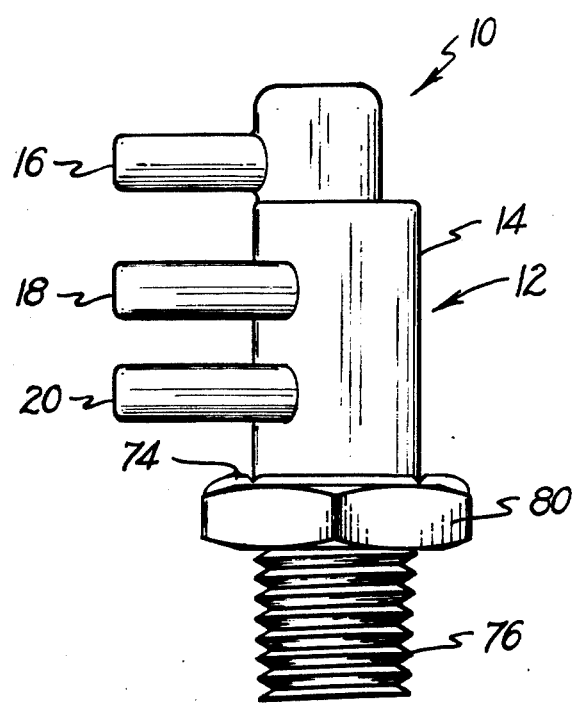
FIG. 1 is a front plan view of the valve assembly of this invention.

Referring now to the drawings, a double throw thermally responsive valve assembly 10 of this invention has a two part generally cylindrical valve body comprising a first valve part 14 and a second valve part 74. The first valve body part 14 as shown in FIGS. 2 and 3 has a first, a second and a third port 16, 18 and 20 which are generally perpendicular to the body part 14. The three ports 16, 18, and 20 each have central bores 22, 24 and 26 respectively which run the entire length of the ports and respective external nipple portions 23, 25 and 27. First valve part 14 and ports 16, 18 and 20 are preferably made from one piece of material such as glass filled nylon. Ports 16, 18 and 20 are typically connected with tubing (not shown) which run between valve 10 and the vacuum or vent sources and control functions which the valve operates. The disposition of ports 16, 18 and 20 are conveniently parallel and adjacent to one another yielding a valve which is compact in size.

Central bores 22, 24 and 26 all connect with a central cavity 28 within first valve part 14. Bores 24 and 26 lead directly into cavity 28 whereas bore 22 leads into a connecting passage 30 which in turn leads into cavity 28. The outlet of connecting passage 30 into cavity 28 functions as the upper or first valve seat 32 for valve assembly 10 to be discussed further below.

Anchored within cavity 28 as by press fitting is a bushing 34 having a central hub 46 depending therefrom and having an axially extending bore 36 running through bushing 34 comprising a large diameter portion 38 and a smaller diameter portion 40. In addition to axially extending bore 36 bushing 34 has a laterally extending bore 42 positioned in hub 46 in communication with bore 36 preferably adjacent to central bore 26 and perpendicular to axially extending bore 36 which provides a passage between port 18 and port 20. The passage extends from port 18 to cavity 28 through large diameter portion 38 and laterally extending bore 42 to cavity 28 and to port 20. The small diameter portion 40 serves to maintain proper alignment of a transfer pin 44 to be discussed below. Bushing 34 may be made from glass filled nylon similar to the material for first valve part 14.

In accordance with this invention a lower or second valve seat 48 is formed where the large diameter portion 38 of axially extending bore 36 opens into the upper portion of central cavity 28 as shown in FIGS. 2 and 3. Positioned between first valve seat 32 and second valve seat 48 is a stopper 50 as viewed in FIGS. 2 and 3 with preferably a first conical portion 52 and a second conical portion 54 with a circular flange piece 56 positioned between portions 52 and 54. Stopper 50 may conveniently be formed from a single piece of material such as rubber. The two conical portions 52 and 54 may have an acute included angle such as sixty degrees so that the two external ends 58 and 60 have diameters smaller than those of valve seats 32 and 48 while the internal ends 62 and 64 have diameters larger than valve seats 32 and 48. The purpose of conical shaped portions 52 and 54 of stopper 50 is to allow them to reliably seal the valve seats.

A coil spring 66 as shown in FIGS. 2 and 3 at one end fits over tubular portion 68 at the opening of connecting passage 30 into cavity 28 and at the other end rests on flange piece 56 of stopper 50. Spring 66 serves to bias stopper 50 toward second valve seat 48. The spring has a predetermined spring constant which is compatible with the snap-force of a bimetallic member 72 to be discussed further below.

A second valve body part is generally indicated by numeral 74 and is shown to comprise a cup-shaped member adapted to be sealingly secured to first body part 14. More particularly second body part 74 comprises a member of thermally conductive material such as brass having a preferably hollow threaded stud 76 and a shallow central cavity 70 with a flat bottom 96 which serves as a seat for reception of a wave spring washer 78, bimetallic member 72 and first body part 14. Body part 74 has a hexagonal shaped portion 80 enabling the valve assembly 10 to readily be inserted in a threaded hole and also a relatively thin wall 82 extending upwardly from the hexagonal shaped portion 80. A shoulder 84 is formed at the junction of wall 82 with the remainder of portion 80 and against which a first circular projection 86 of body part 14 bears when the two body parts are assembled. A sealing gasket 88 (e.g. an O-ring) is disposed in a notched portion 90 of body part 14 and is compressed when side wall 82 is rolled over to sealingly secure the two valve portions together to form valve body 12.

Bimetallic member 72 is preferably a dish-shaped element having one layer of metal of a low thermal coefficient of expansion and another layer of metal of a somewhat higher thermal coefficient of expansion. The outer peripheral edge of bimetallic member 72 is secured between wave spring 78 and a second smaller circular projection 92 at the bottom edge of body part 14 as shown in FIGS. 2 and 3. Also a recess 94 is provided adjacent projection 92 in body part 14 to allow clearance for member 72. Upon reaching a predetermined temperature bimetallic member 72 will snap between a first position as shown in FIG. 2 and a second position as shown in FIG. 3.

A transfer pin 44 extends through axial bore 36 with one end in contact with stopper 50 and the other end resting on bimetallic member 72. The length of pin 44, the distance between valve seats, and the distance the bimetallic member 72 snaps are coordinated such that when bimetallic member 72 is in the first position stopper 50 biased by coil spring 66 will seal the second valve seat 48 and when the member snaps to the second position, pin 44 will force stopper 50 to seal first valve seat 32. The alignment of pin 44 is controlled by the smaller diameter portion 40 of axial bore 36 in which the size of the bore is just large enough to slidingly receive the pin. The pin may be made from any suitable material such as low carbon steel.

Valve assembly 10 is particularly adapted to be threaded into an object, such as an automotive engine block or the like, to transfer heat from the engine block to bimetallic member 72 so as to heat the member in response to a corresponding temperature increase of the engine block. Upon cooling of the engine block, the member will be maintained at approximately the temperature of the engine.

When valve assembly 10 is installed in an engine, disc member 72 is in the first position as shown in FIG. 2 when the engine is cold thus providing that stopper 50 seals second valve seat 48. This condition allows for passage between ports 16 and 18. As the engine heats up, heat is conducted in body part 74 so as to heat member 72. As member 72 exceeds a predetermined temperature it snaps over-center to a second position which seals the first valve seat 32. This condition allows for passage between ports 18 and 20.

In a typical automotive emission control system, the snap temperature of disc member 72 is below a mean operating temperature to which the valve may be subjected. The temperature override beyond the valve switching temperature will cause the disc member 72 to continue to creep after snapping thereby exerting more force on the stopper 50. In order to avoid compression set of the elastomeric valve material and overstressing of the disc member, wave spring 78 is employed to adsorb some of the force by deflecting at a predetermined force level.

Although the present invention has been shown and illustrated in terms of a specific preferred embodiment, it will be apparent that changes and modifications are possible without departing from the spirit and scope of the inventions as defined in the appended claims. For example, stopper 50 may be in a spherical shape such as a rubber ball and work to seal the valve seats as required.

We claim:

1. A thermally responsive valve assembly comprising a valve body, said body having a first and a second passage therein, two valve seats disposed in said body, the first positioned in said first passage and the second positioned in said second passage, and valve means including a bimetallic member seat formed in said body, a dish shaped snap acting thermostatic bimetallic member disposed at said seat, the member snaps in response to temperature change and simultaneously causes said valve means to likewise move into and out of engagement with said first and said second seats thereby selectively blocking said first passage and said second passage and first spring means disposed adjacent said bimetallic member biasing said member toward the valve seats.

2. A thermally responsive valve assembly as set forth in claim 1 further including a stopper to seal said first and said second valve seats, spring means biasing said stopper against said second valve seat, and a movable transfer means to cause said stopper to move from said second valve seat to said first valve seat when said bimetallic member moves from a first position to a second position.

3. A thermally responsive valve assembly comprising a valve body, said body having a first and a second passage therein, two valve seats disposed in said body, the first positioned in said first passage and the second positioned in said second passage, and a valve means including a thermostatic bimetallic member which moves from a first position to a second position in response to temperature change, a stopper to seal said first and second valve seats, spring means biasing said stopper against said second valve seat, a movable transfer means to cause said stopper to move from said second valve seat to said first valve seat simultaneously when said bimetallic member moves from said first position to said second position, and a wave spring positioned adjacent said bimetallic member for preventing compression set of said stopper and overstressing of said bimetallic member.

4. A thermally responsive valve assembly having a double throw feature comprising a valve body having a first part at one end of said valve body and a second part at another end of said body, the first part of the body having a first, a second a third port, said ports being adapted for connection to fluid lines, a central cavity into which all ports communicate, two passages defined in said body, said first passage connecting said first port and said second port and said second passage connecting said second port and said third port, two valve seats disposed in said body, the first positioned in said first passage and the second positioned in said second passage, and valve means movable into and out of engagement with said first and second seats thereby selectively blocking said first passage and said second passage, said valve means comprising a stopper to seal said first and said second valve seats, a disc seat formed in said body, a dish-shaped snap-acting bimetallic disc disposed at said seat, the disc being responsive to a variation in temperature to change its curvature from a first position to a second position, the first spring means biasing said disc toward said disc seat, second spring means biasing said stopper against said second valve seat, and a movable transfer means causing said stopper to move from said second valve seat to said first valve seat simultaneously when said bimetallic member moves from said first position to said second position, and the second part of the body including a thermally conductive portion adapted for heat-exchange with an object such as an engine, for transferring heat to and from said bimetallic member to increase and decrease the temperature of the member in response to a corresponding increase and decrease in temperature of said object.

5. A thermally responsive valve assembly having a double throw feature comprising a valve body having a first part at one end of said valve body and a second part at another end of said body, the first part of the body having a first, a second, and a third port, said ports being adapted for connection to fluid lines, a central cavity into which all ports communicate, two passages defined in said body, said first passage connecting said first port and said second port and said second passage connecting said second port and said third port, two valve seats disposed in said body, the first positioned in said first passage and the second positioned in said second passage, and valve means movable into and out of engagement with said first and second seats thereby selectively blocking said first passage and said second passage, said valve means comprising a stopper to seal said first and said second valve seats, a dish-shaped bimetallic disc responsive to a variation in temperature to change its curvature from a first position to a second position, spring means biasing said stopper against said second valve seat, a movable transfer means causing said stopper to move from said second valve seat to said first valve seat simultaneously when said bimetallic member moves from said first position to said second position, and a wave spring positioned adjacent said bimetallic member for preventing compression set of said stopper and overstressing of said disc member, and the second part of the body including a thermally conductive portion adapted for heat-exhange with an object such as an engine, for transferring heat to and from said bimetallic member to increase and decrease the temperature of the member in response to a corresponding increase and decrease in temperature of said object.

6. A thermally responsive valve assembly having a double throw feature as set forth in claim 5 wherein said stopper is resilient and flexible with a first conical portion and a second conical portion with a flange piece positioned therebetween.

7. A thermally responsive valve assembly having a double throw feature as set forth in claim 6 wherein valve means includes a connecting passage between said first port and said cavity, the outlet of said connecting passage into said cavity serving as said first valve seat and a bushing disposed between the second and third ports, a passage having an inlet and an outlet formed through the bushing in communication with the second and third ports, the outlet of said bushing passage serving as said second valve seat.

8. A thermally responsive valve assembly having a double throw feature as set forth in claim 7 wherein said thermally conductive portion is made of metallic material having relatively high thermal conductivity, said thermally conductive portion having a threaded portion thereof adapted to be threaded in an opening in said object to insure good heat transfer relation between said object and said bimetallic member.

* * * * *